Sept. 15, 1959  W. H. DOHERTY  2,903,748
METHOD OF FORMING SHOE SOLES
Filed Dec. 9, 1954  4 Sheets-Sheet 1

INVENTOR.
WILLIAM H. DOHERTY
BY
Campbell, Brumbaugh, Free + Graves
his ATTORNEYS.

Sept. 15, 1959 W. H. DOHERTY 2,903,748
METHOD OF FORMING SHOE SOLES
Filed Dec. 9, 1954 4 Sheets-Sheet 3
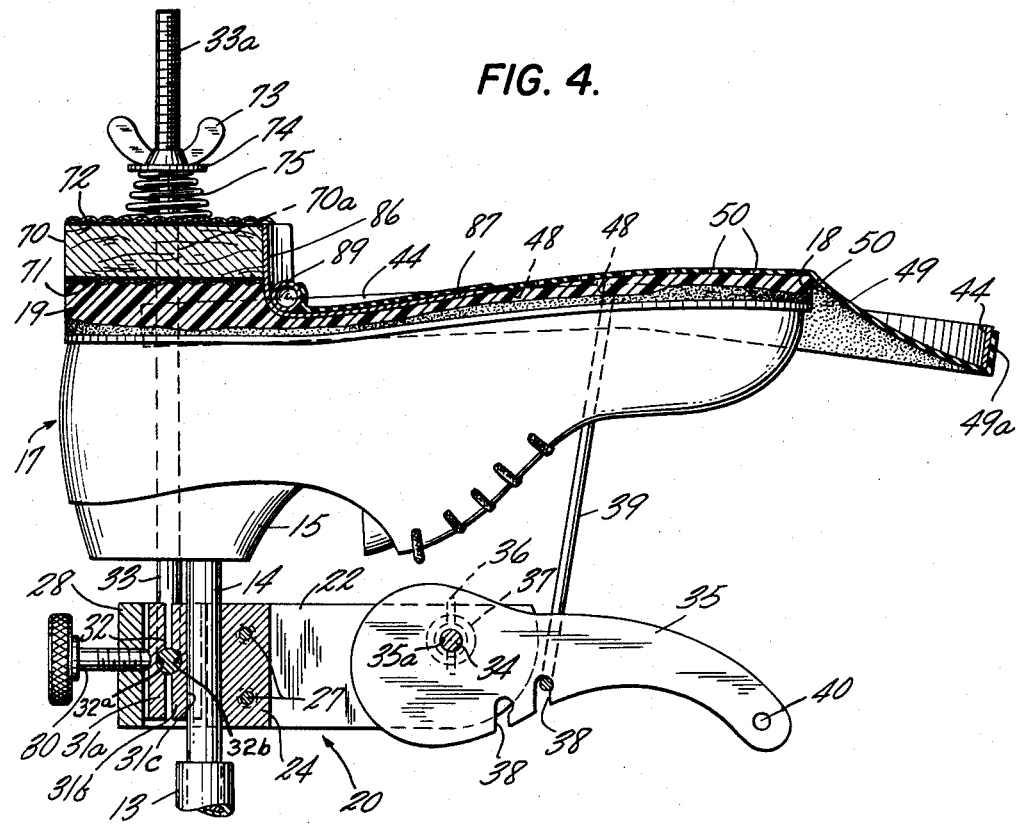
FIG. 4.
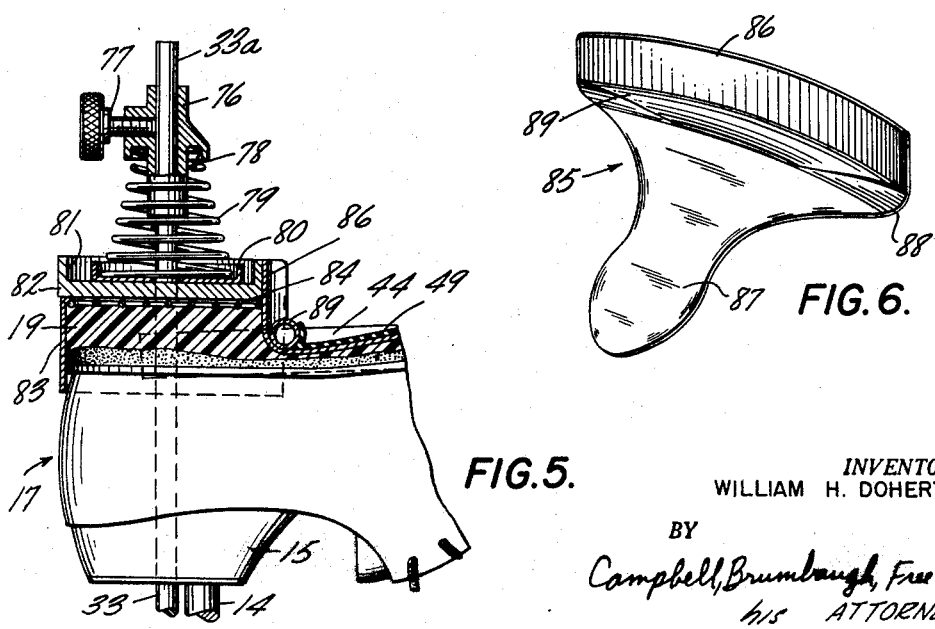
FIG. 5.
FIG. 6.
INVENTOR.
WILLIAM H. DOHERTY
BY
Campbell, Brumbaugh, Free & Graves
his ATTORNEYS.

Sept. 15, 1959 W. H. DOHERTY 2,903,748
METHOD OF FORMING SHOE SOLES
Filed Dec. 9, 1954 4 Sheets-Sheet 4

INVENTOR.
WILLIAM H. DOHERTY
BY
Campbell, Brumbaugh, Free & Graves
his ATTORNEYS

United States Patent Office 2,903,748
Patented Sept. 15, 1959

2,903,748

METHOD OF FORMING SHOE SOLES

William H. Doherty, Rego Park, N.Y.

Application December 9, 1954, Serial No. 474,163

2 Claims. (Cl. 18—59)

This invention relates to methods for forming composition soles and heels on shoes, and has particular reference to the prevention of lateral shrinkage in the production of such composition soles and heels. This application is a continuation-in-part of my copending application Serial No. 263,637, filed December 27, 1951, now U.S. Patent No. 2,770,010.

Composition soles and heels used in the past on shoes have generally been preformed, hardened blanks affixed in various ways to the shoe. Due to the large variety of shoe sizes, an exorbitant number of blanks had to be stocked in manufacturing new shoes and in repairing used shoes.

Recently, various methods have been employed to mold composition heels and soles directly to shoes. For example, the methods and apparatus described in my copending patent application Serial No. 415,283, filed March 10, 1954, now U.S. Patent No. 2,848,742, are employed for this purpose. Ordinarily, a liquid composition, such as natural or synthetic rubber latex, is initially poured into the mold and this gels after a short interval. Subsequently, it slowly dries and hardens while being vulcanized under heat treatment, air drying, etc., and shrinks as much as 40% by volume in this latter process. Such shrinkage in the lateral direction tends to deform the shoe. Accordingly, it is an object of the present invention to prevent lateral shrinkage in composition soles and heels that are dried and hardened after being molded on shoes.

It is another object of the present invention to preclude lateral shrinkage of composition soles and heels by applying constantly increasing pressure normal thereto.

It is a further object of the invention to provide tread on composition shoe bottoms while preventing shrinkage thereof during the drying and hardening process.

These and further objects of the invention are accomplished by engaging at least a portion of the molded shoe bottom with a resilient sheet mounted in a frame. In addition, a pressure member may engage the shoe heel. As the shoe bottom vulcanizes and hardens from its gelled condition, constantly increasing pressure is exerted thereon by the resilient sheet and pressure member to decrease the thickness of the shoe bottom and thereby prevent lateral shrinkage which tends to deform the shoe. Preferably, an irregular surface positioned between the sheet and shoe bottom grips and forms a tread on the composition while it hardens.

These and further objects and advantages of the invention will be more readily understood when the following description is read in connection with the accompanying drawings in which:

Figure 4 is a side elevation, partially broken away, of the press shown in Figure 2;

Figure 5 is a fragmentary view, partially broken away, of a modified form of heel press constructed in accordance with the principles of the present invention;

Figure 6 is a view in perspective of a forming plate employed in a press according to the present invention;

Figure 1:
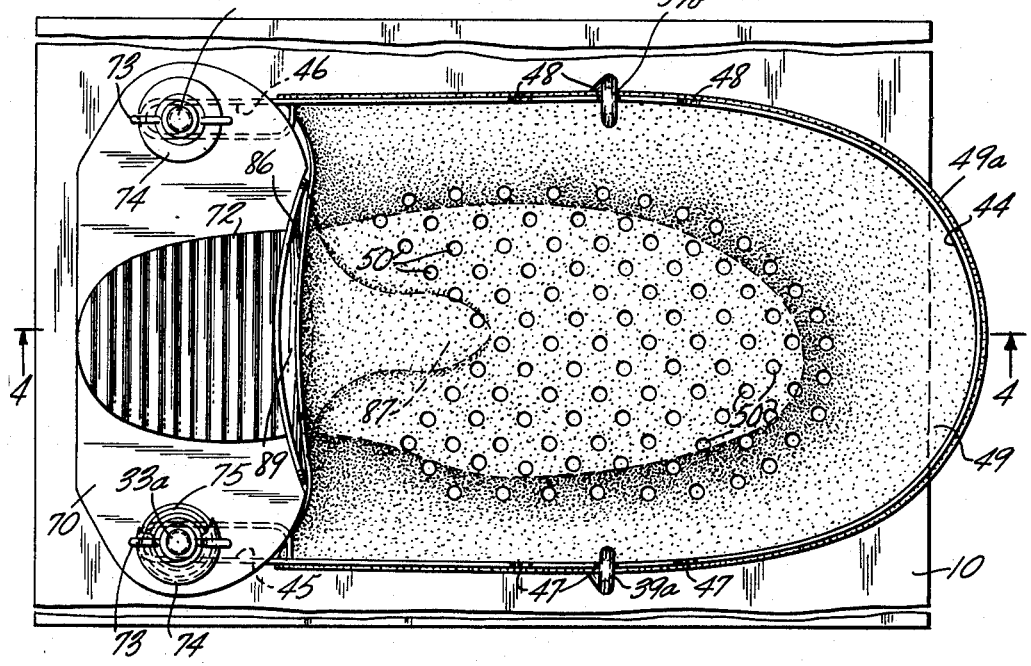
Figure 1 is a plan view of a shoe bottom press constructed in accordance with the principles of the present invention.
Figure 3:
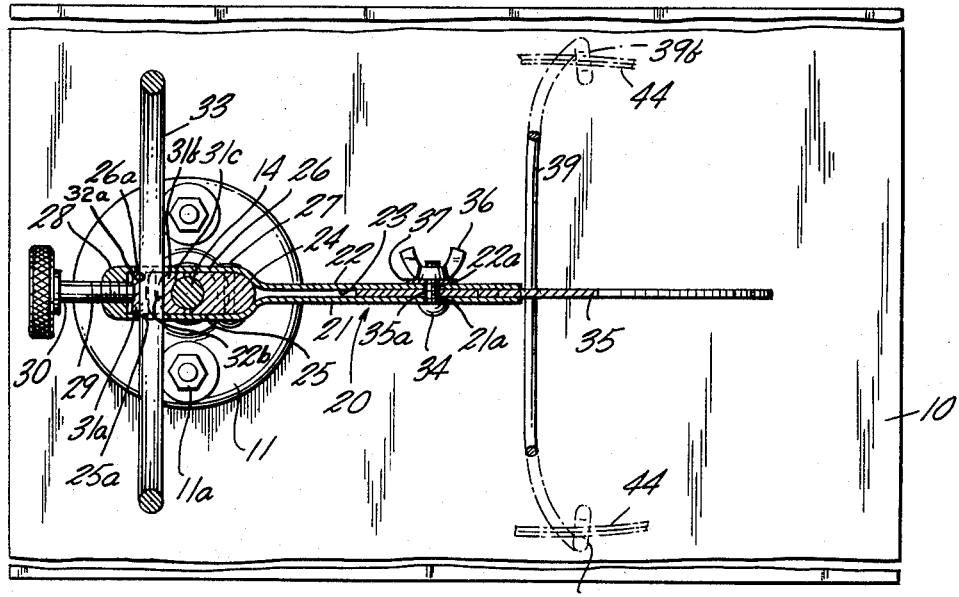
Figure 3 is a lateral section of the press taken on the view line 3—3 of Figure 2 looking in the direction of the arrows.
Figure 2:
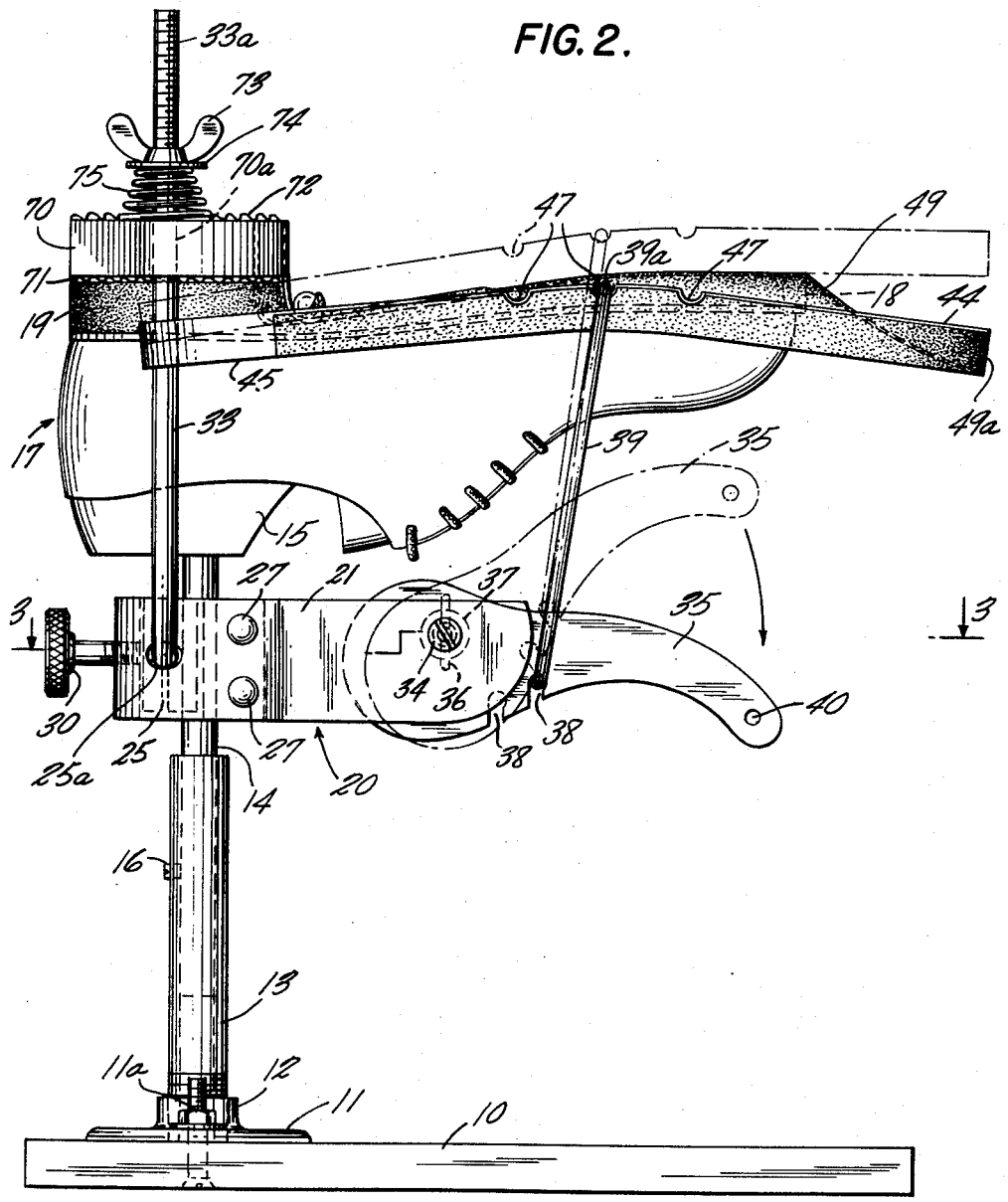
Figure 2 is a side elevation of the press shown in Figure 1.

Referring to an illustrative embodiment of the invention with particular reference to Figures 1 to 4, inclusive, a base plate 10 mounts a flat annular support 11 formed with a threaded boss 12 to receive a threaded hollow cylindrical upright 13. Nut and bolt combinations 11a extend through the base 10 to secure the support 11.

A rod 14 supports a shoe tree or last 15 and is rotatably received by the hollow upright 13. A set screw 16 in the upright 13 may be tightened to engage the rod 15 and preclude rotative movement thereof.

The last 15 is fitted in a shoe 17 carrying a gelled composition sole 18 and heel 19. For example, the sole 18 and the heel 19 may be molded directly on the shoe 17 from natural or synthetic rubber latex in the manner disclosed in my above-referred to application Serial No. 415,283, now U.S. Patent No. 2,848,742, by providing a mold on the shoe, and casting the composition sole 18 and heel 19 in the mold. After such material gels, the mold is removed and the composition sole 18 and heel 19 must be vulcanized and hardened by heat or air drying. In this process, the liquids in the composition evaporate resulting in substantial shrinkage, for example up to 40% of the volume of the sole 18 and heel 19. The present invention prevents shrinkage in the lateral direction, as will be fully explained below.

Mounted on the rod 14 between the upright 13 and the last 15 is a bracket 20 formed with two forwardly extending arms 21 and 22 defining a slot 23 therebetween. In their rearward direction, the arms 21 and 22 flare outwardly around a block 24 and merge with bracket sides 25 and 26. Rivets 27 fasten the bracket sides 25 and 26 to the block 24. An end piece 28 is formed on the ends of the sides 25 and 26 and a threaded opening 29 therein cooperates with a knurled headed set screw 30. Movable blocks 31a and 31b, positioned in the bracket 20 between the sides 25 and 26, are provided with arcuately shaped surfaces 32a and 32b, respectively, which hold a U-shaped supporting rod 33. The other end of the block 31b is formed with an arcuately shaped recess 31c fitting the rod 14. Slots 25a and 26a in the bracket sides 25 and 26 permit the rod 33 to pass through the bracket 20.

From an examination of the above-described bracket 20, it will be evident that by tightening the knurled set screw 30, the block 31a, the rod 33 and the block 31b will be pressed together and against the rod 14. In addition, the block 24 will be forced against the rod 14 to secure the entire bracket 20 thereto. It will be understood that various other equivalent mechanical arrangements may be used to secure these components in their respective positions.

Considering another function of the bracket 20, a screw 34 extends through openings 21a and 22a in the arms 21 and 22 and through an opening 35a in a forwardly extending lever 35 to pivot it in the slot 23. A wing nut 36 and washer 37 function to secure the lever 35 in any desired position.

The lever 35 is formed with a pair of slots 38 adapted to selectively receive a U-shaped adjusting rod 39 having feet 39a and 39b on its opposite ends. An opening 40 on the forward end of the lever 35 may receive any suitable handle, if desired, to facilitate its downward movement. Also, a mechanical linkage may connect the lever 35 to any conventional time controlled elements such as, for example, a piston driven by hydraulic pressure in order to slowly urge the lever 35 downwardly for reasons to be explained in detail below.

Turning next to the elements for applying pressure to the sole 18 and heel 19, a frame 44 is fashioned from a U-shaped strip of metal bent at each end to form loops 45 and 46 which are slidably mounted on the supporting rod 33. It will be noted that the frame 44 is somewhat contoured to follow the shape of the sole 18. A plurality of notches 47 and 48, formed on each side of the upper edge of the frame 44, selectively receive the feet 39a and 39b of the U-shaped adjusting rod 39, a V or Y-shaped rod arrangement may be employed with the apex of the V or Y towards the lever 35 and the legs thereof engaging two notches in the frame 44. This arrangement may be employed if it is desirable to urge the front and rear of the frame 44 downwardly as evenly as possible.

A resilient sheet 49 formed, for example, from rubber, is fastened to the frame 44 by its edges 49a in any convenient manner such as by a suitable adhesive as shown herein. The resilient sheet 49 preferably extends to the forward edge of the loops 45 and 46 so that when it is lowered on the shoe 17, it presses against the entire sole 18 to a position substantially adjacent to the heel 19. An irregular surface between the sheet and the sole 18 is formed by openings 50 found in the sheet 49. This grips the sole 18 and accordingly aids in preventing lateral shrinkage while it is being vulcanized and hardened. Furthermore, the openings 50 provide a tread on the sole 18.

Figure 8:
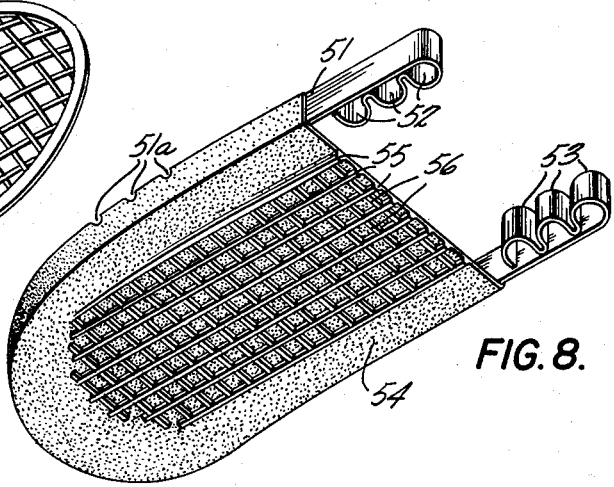
Figure 8 is a view in perspective of a frame mounting a resilient sheet for use in the apparatus shown in Figure 1.
Figure 9:
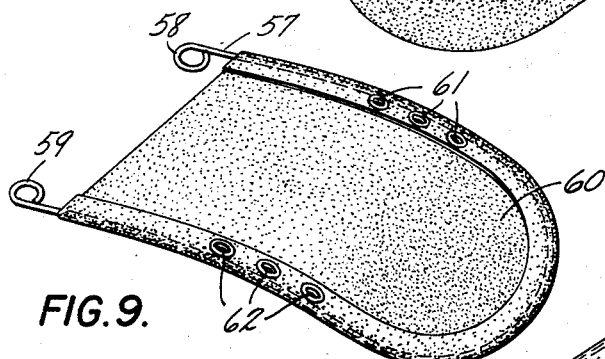
Figure 9 is a modified form of frame and resilient sheet.
Figure 10:
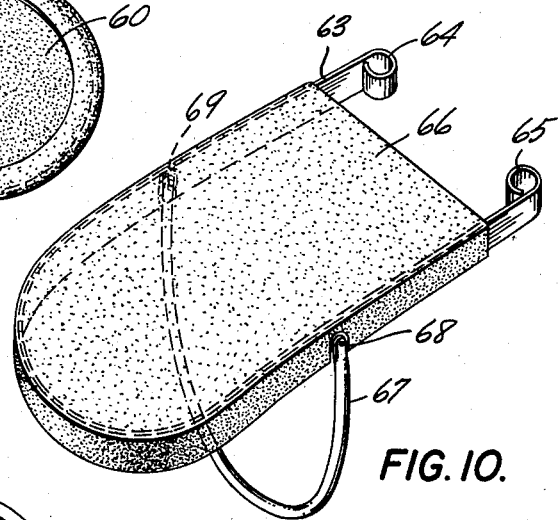
Figure 10 is a further modified form of frame and resilient sheet.

Further frame and resilient sheet combinations are illustrated in Figures 8, 9 and 10. A frame 51, shown in Figure 8, is similar to the frame 44 except for the provision of three loops 52 and 53 formed on the ends thereof to provide for longitudinal adjustment with respect to the rod 33. A plurality of notches 51a on the upper edge of the frame 51 selectively receive the adjusting rod feet 39a and 39b. In addition, a resilient sheet 54 on the frame 51 carries longitudinal strips 55, joined by short transverse strips 56, to aid in preventing lateral shrinkage of the sole 18 and to provide a tread thereon.

The frame and resilient sheet combination illustrated in Figure 9 is somewhat different from those described above. Thus, a wire frame 57, provided with loops 58 and 59 on the ends thereof for positioning on the rod 33, carries a resilient sheet 60 provided with eyelet openings 61 and 62 on either side thereof to receive the adjusting rod feet 39a and 39b.

Figure 10 shows a frame and resilient sheet unit similar to that shown in Figure 1. The frame 63 is formed from a suitably bent strip having loops 64 and 65 at its ends and mounts a resilient sheet 66. It will be noted that the resilient sheet 66 is folded over the frame 63 in the opposite direction to the folds employed with the sheets described above. Obviously, the other resilient sheets may be positioned in a similar manner on their frames. An integral adjusting U-shaped rod 67, pivoted at 68 and 69 on the sides of the frame 63, is provided in Figure 10. It will be apparent that the features in the modifications shown in Figures 1, 8, 9 and 10 may be interchanged among each other in order to provide the best frame and resilient sheet combination for any particular application.

Figure 11:
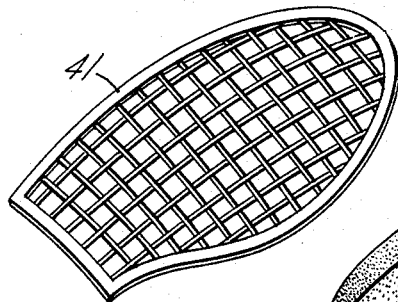
Figure 11 is a perspective view of a contoured screen comprising an irregular surface employed in the apparatus of Figure 1.

Referring next to Figure 11, a screen 41, contoured to the shape of the sole 18, may comprise an irregular surface between the resilient sheets 60 or 66 and the sole 18. The screen 41 may be formed from stainless steel wire, for example, and affixed to the resilient sheets 60 or 66 in any desired manner or alternatively, it may be merely inserted between the sheets 60 or 66 and the sole 18. It will be apparent that the screen 41 performs the same function as the irregular surface on the resilient sheets 49 and 54 in that it grips the sole 18 to aid in preventing lateral shrinkage thereof as well as functioning to provide a tread thereon. It will be understood that various other irregular surfaces may be substituted for the screen 41, depending on the tread desired, as long as they suitably grip the sole 18 while under pressure from the resilient sheets 60 or 66.

To maintain the heel 19 under a constantly increasing pressure as it vulcanizes and hardens, a heel pressure plate 70, shown here constructed of wood but obviously formable form any other desired material, is slidably mounted by openings 70a on the U-shaped supporting rod 33. Irregular surfaces constituted by corrugated pieces 71 and 72 are found on the lower and upper surfaces of the plate 70 to preclude lateral shrinkage of the heel 19 as well as for forming a tread thereon. These corrugated pieces 71 and 72 may be formed from any suitable material, for example, stainless steel, and are positioned so that the plate 70 may be turned to provide a different tread on different shoes or to fit right and left hand shoes. In addition, the pieces 71 and 72 may be large enough to fit the largest size shoe to be used in the press since it is immaterial if they overlap the heels found on smaller shoes.

The ends of the supporting rod 33 are threaded at 33a to receive wing nuts 73 bearing against washers 74 and coil springs 75 to urge the plate 70 downwardly against the heel 19. It will be apparent that other similar mechanical arrangements may be utilized to exert pressure on the heel 19. For example, referring to Figure 5, each end of the U-shaped supporting rod 33 carries a collar 76 provided with a knurled headed set screw 77. An annular recess 78 on the lower end of the collar 76 receives a coil spring 79, which is retained in a cup 80 mounted in an annular recess 81 in a pressure plate 82.

Figure 7:
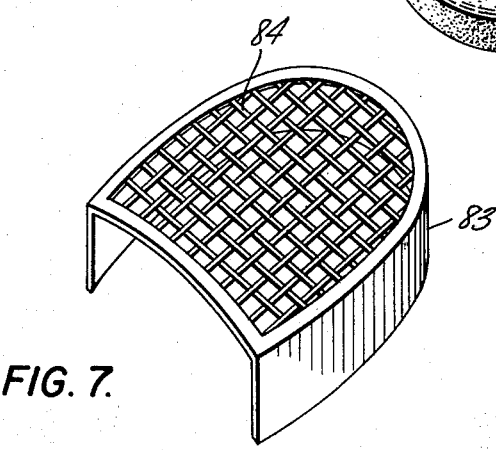
Figure 7 is a perspective view of a heel cup that may be utilized in the press shown in Figure 5.

In this modification, a heel cup 83, shown in some detail in Figure 7, is employed in place of the plate 70. Preferably, the cup 83 is formed with its flat surfaces consisting of screening 84 for precluding lateral shrinkage of the heel 19 and to impart a tread thereto. The use of the heel cup 83 in the correct size also serves to shape the heel 19 to a somewhat greater extent than the plate 70 since it serves to prevent lateral expansion thereof when pressure is applied. It will be apparent that instead of the screening 84, various other irregular surfaces may be employed to prevent lateral shrinkage of the heel and to form a tread thereon.

Referring next to Figures 4, 5 and 6, a shank and heel forming plate 85 is employed under the sheet 49 to secure a desired contour for the shank and heel breast of the shoe 17. As shown in Figure 6, the plate 85 consists of an arcuate portion 86, bearing against the breast of the heel 19, and a forwardly extending tongue portion 87 positioned on the shank of the shoe bottom. These portions are joined by a rounded section 88 reinforced by a rolled piece of strip metal 89. As shown most clearly in Figure 4, the resilient sheet 49 holds the plate 85 in its proper position against the shank and heel 19, the plate 85 also serving to properly position the plate 70 or the heel cup 83 and the plate 82.

In employing the principles of the present invention, the shoe 17 is mounted on the last 15 and the various elements of the press placed in position, as shown in Fig.

ure 2. In addition, the frame 44 and the lever 35 are initially in the position indicated by the broken outline thereof. The sole 18 and the heel 19 of the shoe will be in a gelled condition, being composed of natural or sythetic latex or an equivalent composition. The lever 35 is then moved downwardly to exert pressure on the sole 18 by means of the sheet 49. Also, the wing nuts 73 are somewhat tightened in order to exert pressure on the heel 19. Initially, the pressure may be only a few ounces in magnitude since the gelled latex will be relatively soft.

At this time, if desred, or if required for vulcanization and hardening of the gelled composition constituting the sole 18 and the heel 19, heat may be applied to the bottom of the shoe 17 in any conventional manner. For example, infra-red lamps may be employed or the entire assembly may be placed in an oven. As the vulcanization and drying of the composition sole 18 and heel 19 continues, a substantial decrease in the volume of the gelled composition will occur due to shrinkage. In order to preclude lateral shrinkage, the thickness of the sole 18 and heel 19 must be decreased to accommodate the decrease in volume of the gelled composition. Therefore, as the hardening and drying of the composition shoe bottom progresses, the lever 35 must be further moved downwardly and the wing nuts 73 further tightened in order to exert a greater amount of pressure on the sole 18 and heel 19. When the shoe sole 18 and the heel 19 have completely vulcanized, hardened and dried, the gradually increasing pressure will result in the application of moderate pressure by the resilient sheet 49, the plate 70 and the plate 85, for example, between 50 and 100 pounds, in order to prevent lateral shrinkage.

If desired, the automatic pressure control system referred to above may be operative to gradually increase the pressure on the sole 18. In addition, means may be provided in connection with the plates 70 or 82, synchronized with the pressure control system for the sole 18 or separate therefrom, as desired, to gradually increase the pressure on the heel 19.

In connection with the principles of the invention illustrated in Figure 5, the collar 76 may initially be adjusted to urge the plate 82 and the heel cup 83 against the heel 19 with considerable force. This will tend to laterally spread the heel 19 but the side walls of the cup 83 effectively preclude such action. Subsequently, the pressure on the walls of the cup 83 will decrease as the heel 19 shrinks. This arrangement permits a reduction in the number of pressure settings to a single setting, in certain instances, during the hardening of the heel 19. It will be evident that side walls may be formed on the screen 41, for example, to function with the sole 18 in a manner similar to that described in connection with the heel cup 83 and the heel 19.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. A method of forming a bottom on a shoe comprising the steps of providing a mold on the shoe, casting a composition shoe bottom in the mold, removing the mold from the shoe after the composition shoe bottm has gelled, initially exerting a small reference pressure on at least a portion of the gelled composition shoe bottom and normal thereto, and increasing the pressure in a predetermined manner as the gelled composition dries to reduce the thickness of the composition shoe bottom and prevent lateral shrinkage thereof.

2. A method as defined in claim 1, including the additional step of positioning an irregular surface on at least a portion of the gelled composition shoe bottom prior to exerting pressure thereon.

References Cited in the file of this patent

UNITED STATES PATENTS

| | | |
|---|---|---|
| 1,978,985 | Cobb | Oct. 30, 1934 |
| 1,989,853 | Finn | Feb. 5, 1935 |
| 1,998,896 | Kay | Apr. 23, 1935 |
| 2,055,742 | Burke | Sept. 29, 1936 |
| 2,379,218 | Dial et al. | June 26, 1945 |
| 2,570,284 | Stott | Oct. 9, 1951 |
| 2,613,394 | Doherty | Oct. 14, 1952 |
| 2,650,390 | Capdevila | Sept. 1, 1953 |
| 2,686,935 | Stott | Aug. 24, 1954 |
| 2,770,010 | Doherty | Nov. 13, 1956 |